Patented July 29, 1952

2,605,186

UNITED STATES PATENT OFFICE 2,605,186

STABILIZATION OF GLYCERIDE OILS WITH ACETONE DICARBOXYLIC ACID

Arthur W. Schwab, Helen A. Moser, and Cyril D. Evans, Peoria, Ill., assignors to the United States of America as represented by the Secretary of Agriculture No Drawing. Application October 5, 1951, Serial No. 250,010

7 Claims. (Cl. 99—163)

(Granted under the act of March 3, 1883, as amended April 30, 1928; 370 O. G. 757)

A non-exclusive, irrevocable, royalty-free license in the invention herein described, for all governmental purposes, throughout the world, with the power to grant sublicenses for such purposes, is hereby granted to the Government of the United States of America.

This invention relates to the treatment of glyceride oils or fats and such related materials as synthetically produced esters of long chain fatty acids and edible compositions comprising fats of animal or vegetable origin. It relates particularly to the treatment of such fatty substances to prevent oxidative deterioration and to increase the storage life of such fatty substances, particularly as food materials.

Glyceride oils of animal or vegetable origin are known to deteriorate more or less rapidly in storage and to develop off-flavors and odors which reduce their utility and value as food materials or as ingredients in pharmaceutical or cosmetic compositions. This deterioration is mainly due to oxidative processes which are extremely difficult to control. Difficulty of control is due largely to the presence of small quantities of metals which act as autoxidation catalysts.

According to this invention, glyceride oils which contain small quantities of metallic constituents of the class which possesses oxidative catalytic properties are treated to remove such metals or to neutralize their catalytic effect, thus increasing the oxidative stability of the oil.

We have discovered that acetone dicarboxylic acid, when added to the glyceride oils or fats, or the glyceride derivatives previously mentioned, imparts improved oxidative and flavor stability. This acid apparently has the ability to nullify the catalytic actions of the metals, such as iron and copper, which commonly act as autoxidation catalysts in oils.

Accordingly, we utilize our discoveries to increase the oxidative stability and the flavor stability of glycerides, particularly vegetable oils, such as soybean oil, cottonseed oil, peanut oil, mustard seed oil, corn oil, safflower oil, and the like, by adding thereto stabilizing amounts of the acetone dicarboxylic acid.

Glyceride oils vary in their natural stability and also vary in their content of heavy metal impurities. In the case of commercially refined edible oils of varied agronomic origin, the iron content has been found to vary as much as one hundred fold, ranging from 0.03 part per million upward. The copper content has been found to vary as much as ten fold, from 0.01 part per million up to 0.1 per million. Moreover, the metal equipment with which the oil comes in contact during handling is believed to contribute somewhat to the heavy metal content of the oil.

As previously mentioned, the acetone dicarboxylic acid stabilizer gives excellent results in general to produce an oil with improved oxidative and flavor stability, thus increasing the storage life of the oil. Acetone dicarboxylic acid is especially effective in stabilizing oils which have an unusually high content of metals such as iron and copper.

According to our invention, the addition of the stabilizer is relatively simple, since it is readily dispersible in the oil, and the addition may be effected at any desired stage in the conventional treatment of the oil. For example, it may be added to the raw oil, or it may be added at any convenient stage of conventional refining. It is convenient, in a process involving refining followed by steam deodorization, to add the stabilizer to the oil before the deodorization step. However, a slightly better stabilizing effect may be achieved by adding the stabilizer at temperatures below 70° C., as for example, after the deodorization while the oil is cooling. By our invention, we are able to produce a raw oil or a refined oil, or food, pharmaceutical, or cosmetic compositions with improved stability.

We add to the oil an amount of acetone dicarboxylic acid ranging from 0.001 to 0.1 percent based on the weight of the oil. In the following examples, samples of vegetable oils were treated with the stabilizer just before the deodorization step of a conventional refining procedure, except as noted in the table. Deodorization was carried out in a laboratory steam deodorizer for 3 hours at 210° C. Control samples containing no stabilizer were also subjected to the tests, for purposes of comparison. As a further basis for comparison, oil samples containing added catalytically active metals were also evaluated, both with and without the stabilizer.

A chemical evaluation, based on the Active Oxygen Method (Swift Stability Test) was made, which provides the peroxide values, taken after the samples are blown with air for 8 hours at 208° F. These are termed the A. O. M. values. The oils were also evaluated organoleptically. The taste panel was composed of persons skilled in taste testing, and the flavor scores given below are based on a 1 to 10 scoring system in which the highest score is 10. The results are tabulated below.

Table I

| Oil | Control | | | 0.01 Acetone dicarboxylic acid | | |
|---|---|---|---|---|---|---|
| | A. O. M. | Flavor score | | A. O. M. | Flavor score | |
| | | At 0 time | Stored 4 da. at 60° C. | | At 0 time | Stored 4 da. at 60° C. |
| Oil No. 1, soybean [1] | 28.8 | 8.6 | 6.4 | 3.7 | | 6.2 |
| Oil No. 1, +0.3 p. p. m. Fe | 75.3 | 4.6 | 4.1 | 16.6 | 6.2 | 5.6 |
| Oil No. 2, soybean | 35.2 | | | 17.2 | | |
| Oil No. 3, soybean | 26.0 | 7.5 | 4.8 | 10.2 | 7.8 | 5.4 |
| Oil No. 3, +0.3 p. p. m. Fe | 78.6 | 3.8 | 2.5 | 26.9 | 5.8 | 4.1 |
| Oil No. 4, soybean | 23.0 | 8.1 | 4.8 | 10.8 | 7.8 | 5.3 |
| Oil No. 4, +0.3 p. p. m. Cu | 86.5 | 3.2 | 2.3 | 13.4 | 5.1 | 5.1 |

[1] Oil No. 1 was treated with the stabilizer after deodorization, during the cooling stage, when the oil had cooled to about 70° C.

Likewise, we may substitute for the vegetable oils in the foregoing examples, others such as cottonseed oil, peanut oil, corn oil, safflower oil and the like, or hydrogenated vegetable oils, or animal oils and fats, such as lard, lard oil or tallow. Moreover, corresponding stabilized effects are obtained in preventing the oxidative deterioration of the raw glycerides.

The stabilizing effect of acetone dicarboxylic acid has been explained in part in the foregoing specification by the ability of the stabilizer to nullify the deleterious effects of heavy metal autoxidation catalysts present in the oil. It is to be understood that this invention is not limited to such explanation, inasmuch as we have found that the stabilizer is effective in preserving the odor and taste of the oils without specific dependence on the presence of autoxidation catalysts.

We claim:

1. A new composition of matter, a glyceride oil and a stabilizing amount of acetone dicarboxylic acid.

2. A new composition of matter as described in claim 1 in which the glyceride oil is of vegetable origin and the stabilizer is present within the range of 0.001 to 0.1 percent based on the weight of the oil.

3. The composition of claim 2 in which the oil is soybean oil.

4. The composition of claim 2 in which the oil is cottonseed oil.

5. The process of stabilizing a glyceride oil against oxidative deterioration which comprises incorporating into the oil from 0.001 to 0.1 percent acetone dicarboxylic acid based on the weight of the oil.

6. In a process for refining a glyceride oil which includes the conventional steps of refining and steam deodorization, the improvement which comprises adding to the oil 0.001 to 0.1 percent acetone dicarboxylic acid based on the weight of the oil prior to said deodorization.

7. In a process for refining a glyceride oil which includes the conventional steps of refining and steam deodorization, the improvement which comprises adding to the oil 0.001 to 0.1 percent acetone dicarboxylic acid based on the weight of the oil subsequent to said deodorization.

ARTHUR W. SCHWAB.
HELEN A. MOSER.
CYRIL D. EVANS.

No references cited.